United States Patent [19]

Skinner

[11] Patent Number: 4,478,437
[45] Date of Patent: Oct. 23, 1984

[54] RADIALLY EXPANDABLE LOCKING SLEEVE DEVICE

[75] Inventor: William O. Skinner, Grabill, Ind.

[73] Assignee: Press/Seal Gasket Corp., Fort Wayne, Ind.

[21] Appl. No.: 287,049

[22] Filed: Jul. 27, 1981

[51] Int. Cl.³ .................... F16L 5/00; F16L 21/00; F16L 17/00; F16L 55/00

[52] U.S. Cl. .................... 285/189; 285/236; 285/370; 285/39; 24/20 EE; 277/1; 277/DIG. 2

[58] Field of Search ............ 285/189, 237, 236, 109, 285/297, 370, 260, 321, 39; 24/20 EE; 277/1, DIG. 2, 212 FB, 221

[56] References Cited

U.S. PATENT DOCUMENTS

| 427,355 | 5/1890 | McLaren | 24/20 EE |
|---|---|---|---|
| 566,074 | 8/1896 | Gilmore | |
| 1,746,429 | 2/1930 | Kelleway | 24/20 EE X |
| 2,670,976 | 3/1954 | Owen | |
| 3,406,988 | 10/1968 | Jones | 285/24 |
| 3,474,832 | 10/1969 | Broadhead et al. | |
| 3,656,771 | 4/1972 | Stout | 277/207 A |
| 3,700,265 | 10/1972 | Dufour | 285/15 |
| 3,759,280 | 5/1976 | Swanson | 4/52 |
| 3,866,925 | 2/1975 | Mainstrom | 277/164 |
| 3,958,280 | 9/1973 | Smith | 137/363 |
| 3,958,313 | 5/1976 | Rossborough | 29/157 R |
| 3,973,783 | 8/1976 | Skinner | 285/189 |
| 4,017,089 | 4/1977 | Kurata | 277/212 FB |
| 4,103,901 | 8/1978 | Ditcher | 29/235 |
| 4,215,868 | 8/1980 | Skinner | 277/1 |

FOREIGN PATENT DOCUMENTS 858033 5/1940 France .
136459 3/1930 Switzerland .

Primary Examiner—Richard J. Scanlan, Jr.
Attorney, Agent, or Firm—George A. Gust

[57] ABSTRACT

This invention relates to a radially expandable locking sleeve device and to a gasket apparatus for providing a fluid tight seal between a pipe and a porthole in the wall of a manhole riser. The gasket is in the form of a tubular element of elastomeric material. An annular recess is provided in the inner surface of the gasket near one end for receiving a radially expandable split sleeve having interlocking end portions. The outer circumferential surface of the locking sleeve is so arranged as to continue uninterruptedly across the area of the interlocking end portions, and the end portions when engaged lock against both lateral displacement and circumferential collapsing of the sleeve.

11 Claims, 16 Drawing Figures

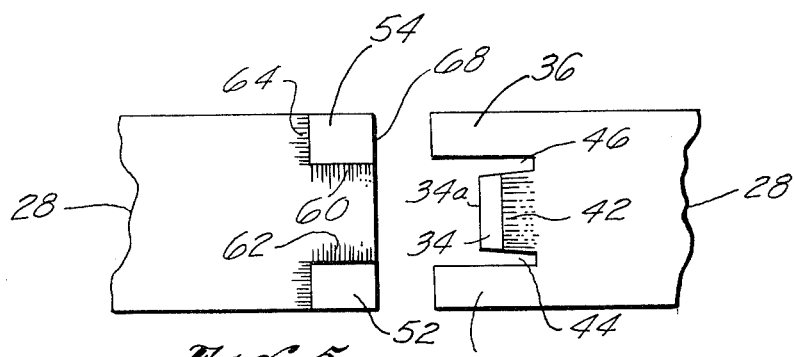
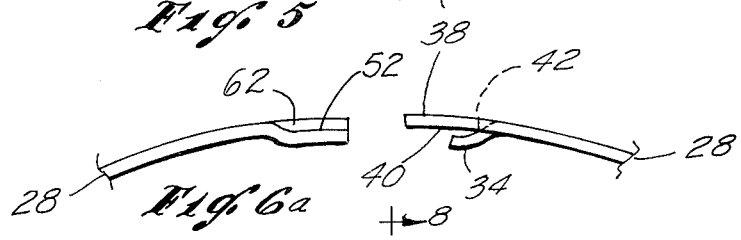
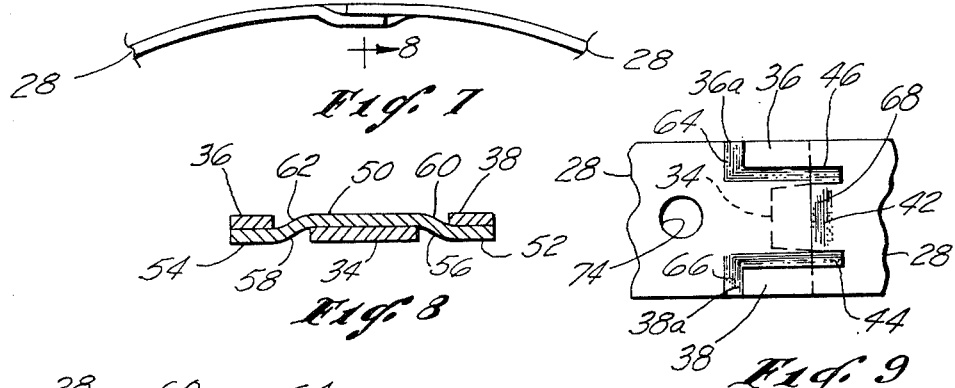
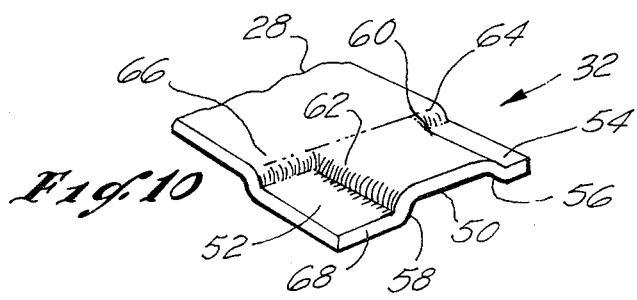
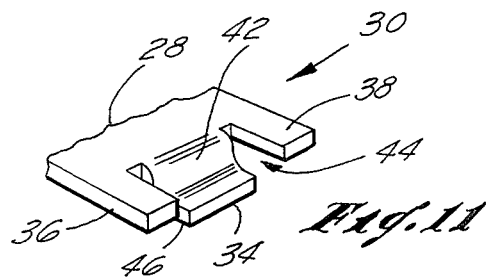
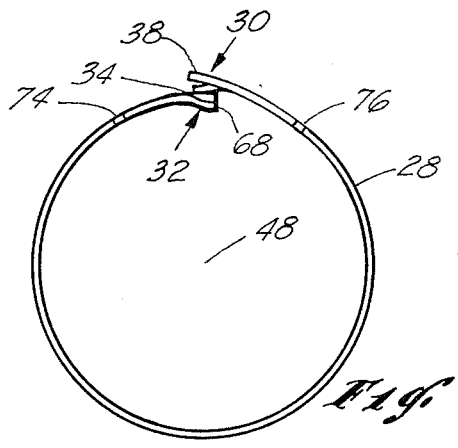
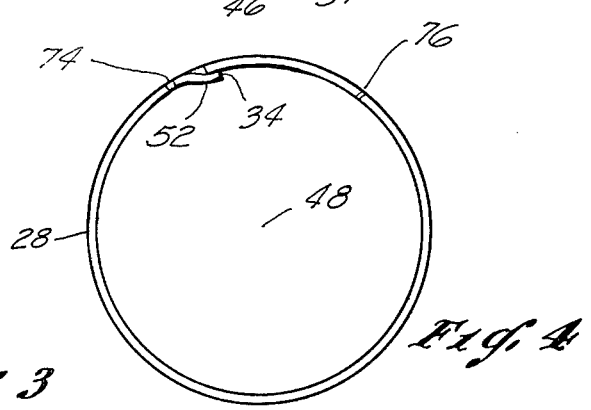

RADIALLY EXPANDABLE LOCKING SLEEVE DEVICE

BACKGROUND OF THE INVENTION

1. Field of the Invention

The present invention relates to a radially expandable split sleeve having interlocking end portions to hold the circumferential shape of the sleeve and more particularly the provision of a seal between the porthole in a manhole riser and a horizontally extending pipe fitted thereinto.

2. Description of the Prior Art

Prior art patents bearing some similarity to the present invention include U.S. Pat. Nos. 3,406,988; 3,656,771; 3,700,265; 3,759,280; 3,866,925 and 3,958,280. These patents variously relate to the provision of annular elastomeric gaskets which sealingly fit between the end of a pipe and a hole in another member for preventing leakage between the hole and the exterior of the pipe. In particular, U.S. Pat. Nos. 3,406,988; 3,759,280 and 3,958,313 disclose the use of sleeve-like gaskets having the exteriors at one end sealed to the wall of the hole and the opposite end sealed to either the interior or exterior of a joined pipe. The sealing of the one end to the wall of the hole is also variously achieved, one technique being to cast a radial flange on the sleeve into the concrete of the body containing the hole, and another to seal this flange against the exterior of the wall around the hole by means of a steel or the like clamping ring. Still another arrangement involves inserting the gasket loosely into a hole followed by inserting an expandable, toggle actuated, split ring inside the gasket and then radially moving the toggle to force the ring to an enlarged, expanded size for radially compressing the gasket against the wall of the hole (U.S. Pat. No. 3,958,313). U.S. Pat. No. 3,700,265 shows an expandable split sleeve. A still further arrangement is to drive a tapered tubular wedge into the gasket loosely installed in the hole for radially compressing the gasket against the wall of the hole.

SUMMARY OF THE INVENTION

Broadly, this invention relates to a radially expandable locking sleeve which includes a cylindrical relatively stiff but resiliently flexible split strip of metal having opposed abuttably engageable ends. The sleeve is movable between two positions in which the end portions thereof may first be radially overlapped and secondly may be interlockingly engaged end-to-end. Means are provided for locking the end portions in end-to-end relation, such means including radially overlapped portions on each of the sleeve ends, which have outer peripheral surfaces that lie in and extend over an extended area substantially coincident with the outer cylindrical surface of the sleeve. The overlapped portions include abuttable portions which are both laterally and circumferentially engageable to hold the ends against lateral displacement and against circumferential movement toward each other.

The invention further relates to the combination of the aforesaid expandable locking sleeve and a tubular gasket of elastomeric material, the expandable sleeve being coaxially engaged with the inner surface of the gasket whereby the outer surface of the sleeve substantially uniformly circumferentially uninterruptedly engages the inner surface of the gasket including the outer surface portions of the interlocked sleeve ends.

It is an object of this invention to provide a radially expandable and split locking sleeve which is expandable radially from a first relatively small diameter condition in which end portions of the sleeve are radially overlapped to a larger diameter condition in which the end portions are interlockingly engaged end-to-end with the circumferential surface of the interlocked end portions continuing substantially uninterruptedly and within the cylindrical surface of the sleeve across the joint formed by the interlocking end portions.

It is another object of this invention to provide in combination with the aforesaid locking sleeve a tubular gasket of elastomeric material, with the locking sleeve being mounted coaxially within the gasket for expanding the latter outwardly into sealing engagement with the wall of a surrounding hole.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings.

FIG. 3 is a side view of one embodiment of the radially expandable sleeve of this invention in collapsed condition;

FIG. 4 is a side view of the same sleeve with the ends interlocked;

FIGS. 5a and 5b are fragmentary plan views of the sleeve ends and more particularly of the engageable interlocking end portions in spaced apart relation for clarity of illustration;

FIGS. 6a and 6b are side views thereof;

FIG. 7 is a fragmentary side view of the sleeve showing the end portions interlocked;

FIG. 8 is a cross section taken substantially along section line 8—8 of FIG. 7;

FIG. 9 is a plan view of the sleeve ends interlocked as shown in FIGS. 7 and 8;

FIG. 10 is a fragmentary perspective view of one end portion of the sleeve;

FIG. 11 is a similar view of the other end portion;

DESCRIPTION OF THE PREFERRED EMBODIMENT

Figure 1:
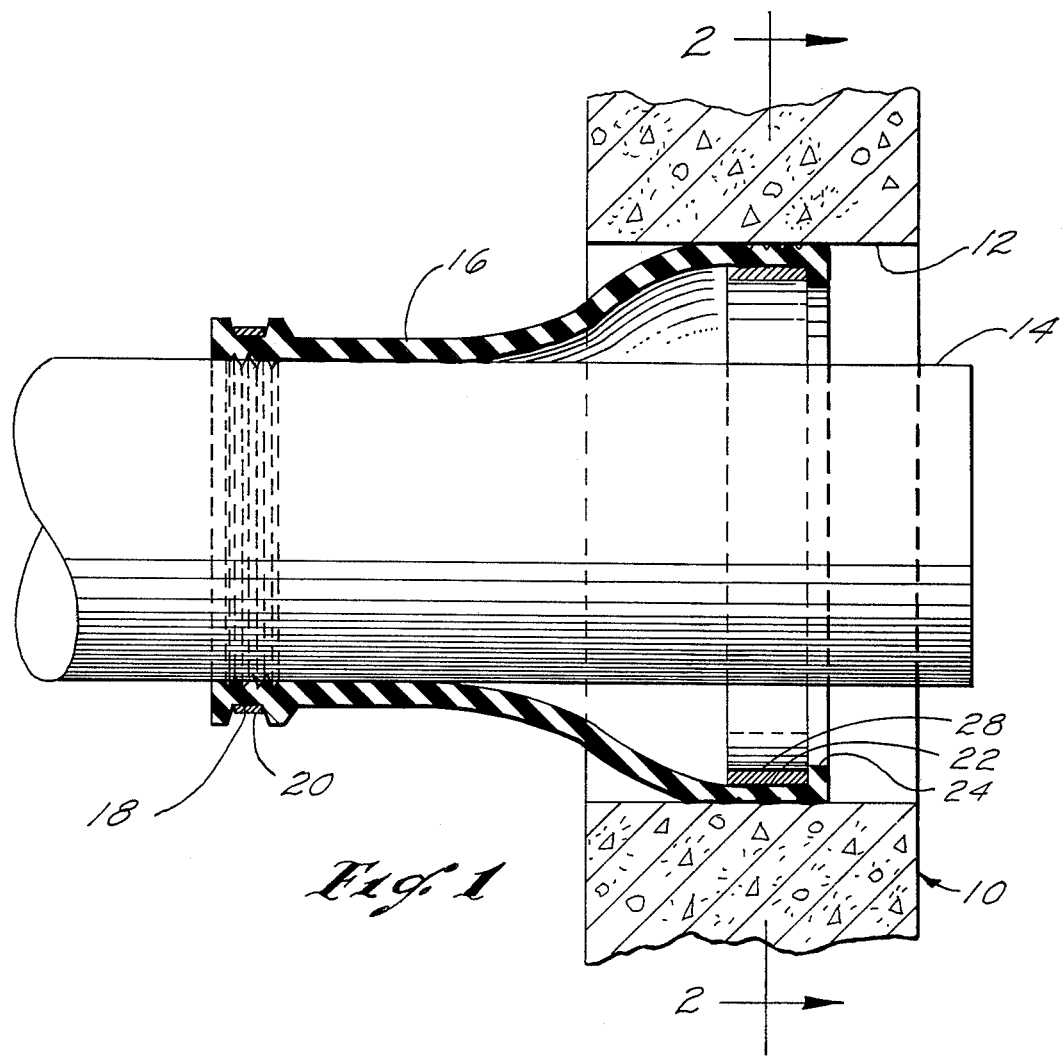
FIG. 1 is a longitudinal sectional view showing one embodiment of the present invention installed within the opening of a manhole riser.
Figure 2:
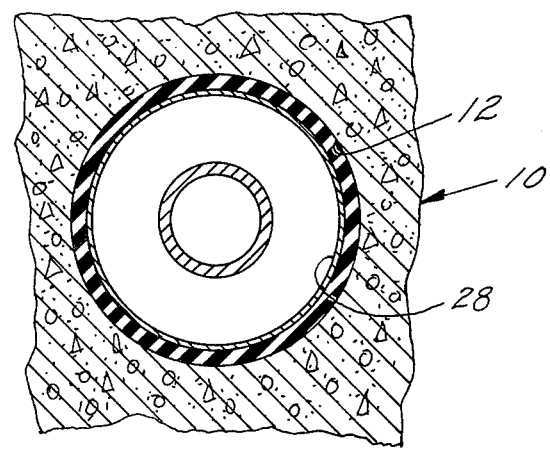
FIG. 2 is a cross-sectional view taken substantially along section line 2—2 of FIG. 1.

Referring to the drawings, and more particularly to FIGS. 1 and 2, a reinforced concrete manhole, generally indicated by the numeral 10 is provided with a conventional pipe-receiving opening 12 in the wall thereof. The construction of this manhole is conventional and may conform to that disclosed in U.S. Pat. No. 3,759,280. As clearly shown, a pipe 14 formed of concrete, plastic or the like received within the opening 12 penetrates to a position beyond the wall of the riser 10.

To seal pipe 14 within the hole 12, a gasket apparatus is employed which includes an elongated sleeve 16 of resilient, elastomeric material, such as rubber, neoprene or suitable plastic. This gasket 16 is provided at the left end with one or more annular groves 18 for receiving in each a conventional screw type, annular clamping band 20 as disclosed in U.S. Pat. No. 4,242,164 and at the other end with an internal cylindrical seat 22 defined at one end by the radially inwardly extending annular rib 24 as shown. The pipe 14 is received through the gasket 16 and the clamping band 20 is tightened to provide a seal between the inner surface of the gasket 16 and the exterior of the pipe 14. A radially expandable, split sleeve 28 is coaxially received within the gasket 16 and more particularly within the cylindrical seat 22, the rib 24 having a radial depth which exceeds the thickness of the clamping sleeve 28 by a factor of two or three times. With the sleeve 28 expanded radially to its maximum diameter, the portion of the gasket 16 radially opposite the sleeve 28 is sealingly compressed against the wall of the opening 12 as shown.

The sleeve 28 is more clearly shown in FIGS. 3 through 11. Preferably, it is formed of a flat steel strip of substantially uniform thickness cut to length and formed to an annular shape with the outer surface being cylindrical. The sleeve is axially split to provide interlocking end portions generally indicated by the numerals 30 and 32 which may be overlapped as shown in FIG. 3 to reduce the diameter of the sleeve 28. Referring first to the end portion 30, it is formed to provide a radially inset tab 34 which extends circumferentially from the body of the sleeve 28 as shown and two circumferential extensions or fingers 36 and 38 on opposite sides thereof. The tab 34 is radially displaced inwardly from the adjacent portion of the sleeve 28 to form a notch 40 in conjunction with the fingers 36 and 38 having a width substantially equal to the thickness of the strip of which the sleeve 28 is formed. The tab 34 is preferably coined or punched from the strip material thereby to form a radiused step portion 42 which integrally joins the tab 34 to the adjacent portion of the sleeve 28. This step portion 42 is made to as small a radius as possible so as to position the tab 34 as close as possible to the adjacent portion of the sleeve 28 for a reason to be explained hereinafter.

In the coining or punching operation, two slots or notches 44 and 46 are provided between the side edges of the tab 34 and the fingers 36 and 38.

Referring to the fingers 36 and 38, the outer surfaces thereof substantially conform to the cylindrical shape of the outer surface of the sleeve 28 so as to serve as cylindrical continuations thereof. These fingers 36 and 38 are of equal length and are about twice as long as the tab 34 as shown. The ends of the tab 34 and fingers 36 and 38 are straight and substantially parallel to the axis 48 of the sleeve 28. The step portion 42 also extends substantially parallel to the axis 48.

Referring to the end portion 32 of the sleeve, this is also preferably formed by means of a punching or coining operation to provide a recess portion 50 and two laterally extending ledge portions 52 and 54. The two ledge portions 52 and 54 are substantially flat and parallel to the cylindrical surface of the sleeve 28 and further are displaced radially inwardly about equal to the thickness of the sleeve 28. In the forming operation, the recess portion 50 is defined by retaining shoulders 56 and 58 which with respect to the sleeve 28 are axially spaced and parallel and extend circumferentially of the sleeve 28. Correspondingly, the ledge portions 52 and 54 have radiused stepped side portions 60 and 62 formed as a part of the retaining shoulders 56 and 58. To the rear, the ledge portions 52 and 54 merge with the adjacent portions of the sleeve 28 by means of radiused abutment steps 64 and 66 which extend in a straight line substantially parallel to the axis 48. The end edge 68 of the end portion 32 is also straight and substantially parallel to the axis 48.

With the sleeve coiled to a smaller diameter as shown in FIG. 3 with the end portions 30 and 32 overlapped, the tab 34 engages the outer surface of the recess portion 50. By radially expanding the sleeve 28, and due to the natural resilience of the sleeve material, the end portions 30 and 32 when spread apart until the distal end 34a of tab 34 just clears the end edge 68 permits the end portion 30 to spring inwardly until the fingers 36 and 38 engage the ledge portions 52 and 54. This brings the distal ends 36a and 38a of the fingers into abuttable alignment with the abutment steps 64 and 66, respectively. Preferably, the portions of the abutment steps 64 and 66 immediately adjacent to the ledge portions 52 and 54 are made substantially radial so that a firm and positive stop is provided for engagement by the finger ends 36a and 38a. The widths of the two fingers 36 and 38 are made to correspond to the corresponding widths of the ledge portions 52 and 54 such that the step side portions 60 and 62 serve as guides and abutments for the inner longitudinal edges of the fingers 36 and 38. The fingers 36 and 38 are thus held against relative lateral displacement with reference to the end portion 32 of the band. Engagement of the finger ends 36a and 38a with the shoulders 64 and 66 prevents further movement of the end portions 30 and 32 toward each other when the latter are properly interlocked.

Referring to FIGS. 3 and 4, by spreading the end portions 30 and 32, as explained previously, the tab 34 upon clearing the end 68 moves radially inwardly until the fingers 36 and 38 engage the ledge portions 52 and 54. This brings the end portions 30 and 32 into locking alignment. If the resilience of the sleeve 28 is not sufficient, the end portions 30 and 32 are now moved toward each other thereby moving the finger ends 36a and 38a toward abutting engagement with the abutment steps 64 and 66 and further moving the front edge 68 and the recess portion 50 into the notch 40 formed between the tab 34 and fingers 36 and 38 as shown more clearly in FIGS. 4, 7, 8 and 9. The step portion 42 on the tab 34 provides an essentially radial abutment surface that extends parallel to the axis 48. This step portion 42 is dimensioned such that when the finger ends 36a and 38a engage the abutment steps 64 and 66, the end edge 68 on the recess 50 abuttingly engages the step portion 42. This is shown in FIG. 9. Thus the end portions 30 and 32 are firmly locked against further movement toward each other.

The overlapping and interlocked portions of the sleeve ends are so proportioned and dimensioned that when interlocked, the circumferential surface of the sleeve continues substantially uninterruptedly across the formed joint. Thus, the outer surface of the recess or channel-shaped portion 50 is essentially coplanar with the outer surfaces of the fingers 36 and 38, all these surfaces conjointly being of extended area so as to lie within and to form a substantially continuous cylindrical surface interrupted only by the small spaces occupied by the various side portions and abutment steps 60, 62, 64 and 66 on the one hand and the very small gap presented by the exposed portions of the slots 44 and 46 and the spacing of the end edge 68 from the cylindrical surface of the immediately adjacent portion of the sleeve 28. These interrupted areas are kept as small as possible in the fabrication of the interlocking portions so as to maintain the discontinuities in the cylindrical surface of the sleeve 28 to a minimum.

Figure 13:
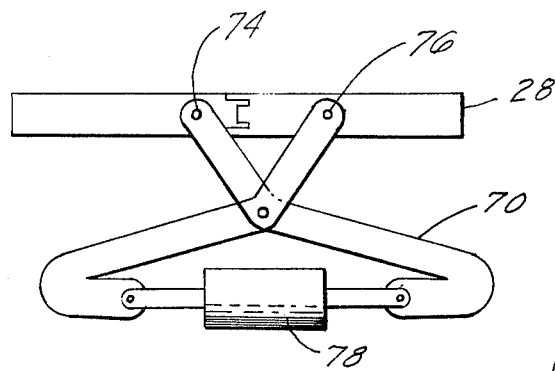
FIG. 13 is a view showing a scissors-type tool used in installing the sleeve.
Figure 13A:
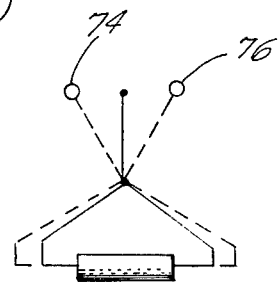
FIG. 13a is a diagrammatic illustration of the tool of FIG. 13 in collapsed and expanded condition.
Figure 12:
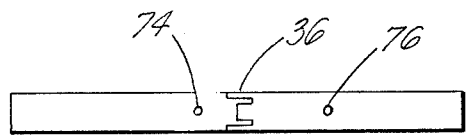
FIG. 12 is a top view of the locking sleeve of this invention with the ends of the sleeve interlocked.
Figure 14:
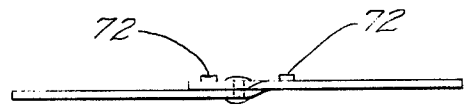
FIG. 14 is an end view of the tool of FIG. 11.
Figure 15:
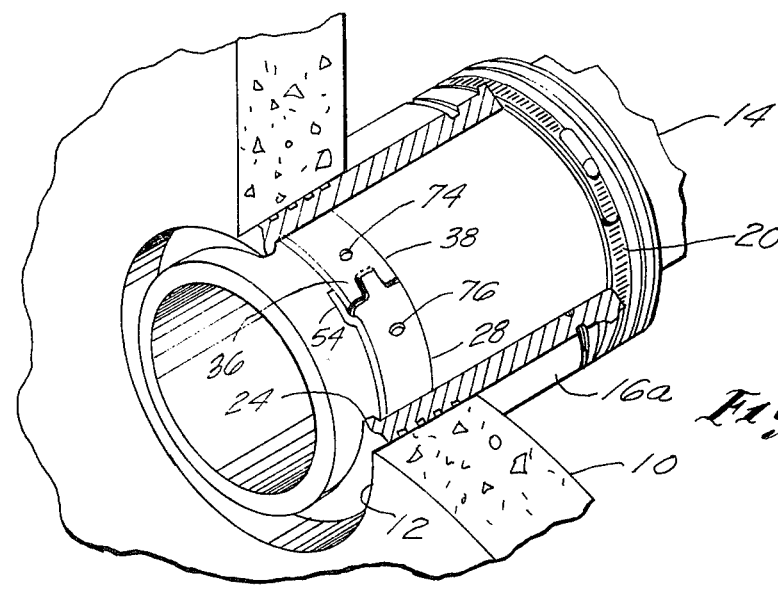
FIG. 15 is a perspective, partially cut away and sectioned view of a typical seal installation using this invention.

Installation of the tubular gasket 16 within an opening 12 will now be explained. The gasket 16 itself is first installed into the opening 12 in coaxial alignment therewith. The gasket 16 is quite flexible and has merely loose engagement, if any, with the wall of the opening 12. Next, the sleeve 28 unlocked and overlapped as shown in FIG. 3 is inserted within the gasket and more particularly within the seat 22 adjacent to the rib 24. A scissors shaped tool 70 as shown in FIGS. 13 and 14 is provided with two spreader pins 72 on the distal ends of the arms thereof. These pins 72 are now inserted into two openings 74 and 76 on opposite sides of end portions 30 and 32 with the tool 70 being held in the position shown in FIG. 13. A suitable, double acting hydraulic cylinder 78 is operatively connected between the scissors arms as shown. Fluid under pressure admitted to the cylinder 78 spreads the tool arms and in turn the spreader pins 72 thereby moving the end portions 30 and 32 into abuting alignment as shown in FIG. 4. Instead of cylinder 78, a threaded jack arrangement may be used. This same movement results in the radial expansion of the sleeve 28 which serves in radially compressing the gasket 16 against the wall of the opening 12. When the end portions 30 and 32 of the sleeve are brought into proper alignment, pressure admitted to the cylinder 78 is relieved permitting the compressive force of the gasket 16 to force the end portions 30 and 32 into locking engagement as previously explained. The gasket 16 is now installed and assuming that the sleeve 28 is of proper dimensions, a fluid tight seal is provided between the outer periphery of the gasket 16 and the wall of the opening 12.

As explained previously, the outer surfaces of the interlocking parts of the sleeve ends are of extended area and lie within the cylindrical surface of the sleeve itself. Thus, the gasket 16 within the area of the joint is substantially cylindrically continuous and uniform with respect to the remaining sleeve portion whereby the gasket 16 around its entire circumference is uniformly compressed into sealing engagement with the wall of the opening 12. The joint in this instance does not present a discontinuity which would permit the gasket 16 to develope a leak.

Further, by reason of the particular overlapped and interlocked portions, the sleeve ends are positively locked against relative movement laterally as well as circumferentially toward each other. This prevents any relative movement which could cause development of a gasket leak.

Furthermore, due to the arrangement and dimensioning of the fingers 36 and 38 and the tab 34, the end portions 30 and 32 in the overlapped position of FIG. 3 need only to spread a short distance before they can be interlocked as shown in FIG. 4. This minimal spreading distance minimizes the amount of compressive overtravel required in compressing the gasket against the wall of the opening 12. With proper dimensioning of the sleeve 28 relative to the size of the gasket 16 and opening 12, this serves in obtaining maximum compression on the wall of the gasket during spreading of the end portions 30 and 32 and maintaining essentially the same compressive force upon interlocking engagement of such end portions 30 and 32.

By reason of the rib 24 extending substantially radially beyond the inner portions of the sleeve 28, engagement of the pipe 14 with sleeve 28 is suitably cushioned or prevented so as to guard against the pipe 14 coming into engagement with a hard, unyieldable position of the sleeve 28 and perhaps causing damage. It will be noted that the holes 74 and 76 in the sleeve 28 are disposed on opposite sides of the formed joint and are relatively close together such that the scissors tool 70 acts along a chord of the band circle rather than a radius thereof. So expanding the sleeve 28 applies the spreading force parallel to the end portions 30 and 32 thereby facilitating the installation of the sleeve 28 within the gasket.

In use, the gasket prevents the ingress of surface water and liquids exterior of the joined pipe and manhole. A pressure of ten (10) pounds per square inch gauge (psig) is not uncommonly encountered. This invention conduces to less critical dimensional tolerances than similar prior art sealing devices and simultaneously provides greater sealing consistency and tighter fits. This is better explained by reference to U.S. Pat. Nos. 4,242,164 and 3,958,313, wherein circular bands are used to compress a tubular gasket against the wall of a hole. In the first mentioned patent the band is solid and unsplit about its circumference. In the latter mentioned patent, the band is split and spread by means of a radially moveable toggle.

With reference to the toggle actuated band, a radial force of high order is exerted on the toggle to force it over center against the compressive reaction of the rubber gasket being radially squeezed. Sometime after removal of the installation force, it is possible for this compressive reaction to be forceful enough to reverse and break the toggle which results in unclamping and unsealing the band. Further, even though the toggle should hold, the links of the toggle tend to form a V-shape thereby reducing the compressive sealing force thereat. Leakage can thus occur past the toggle. Even still further, the reactionary force of the rubber under compression can move the toggle links laterally sufficiently to impair the seal.

In U.S. Pat. No. 4,242,164, it has been the practice to install the solid band by initially canting it at an angle within the gasket. A suitable force is then applied against the band to straighten it into coaxial relation with the hole and gasket. When canted, the opposite corners of the band (which is cylindrical) are spaced from the wall of the hole by the thickness of the gasket. This thickness cannot be too great, because if it is, the band cannot be moved into position without damaging the gasket rubber. If the thickness is too small, the band can be easily moved into position, but the space between the band and hole peripheries relatively become too large thereby resulting in insufficient compression of the gasket rubber to provide an adequate seal. In order to facilitate installation, bands in three different widths were used, ½ inch, ¾ inch and 1 inch. These narrow widths could result in positional instability under some conditions.

By contrast, the sleeve 28 in this invention is relatively wider, typically 1.5 inches, so that once installed, it becomes more stable and cannot be tilted out of sealing position. Since the split sleeve 28 is expanded radially and once expanded presents a relatively uniform cylindrical surface, a maximum thickness of rubber may be used in order to secure a proper seal without regard to having to reduce this thickness for installation purposes as above explained with reference to U.S. Pat. No. 4,242,164. Greater dimensional tolerance in such thickness can now be accepted so long as an adequate seal is obtained: maximizing this thickness up to the point of obtaining an adequate seal and slightly beyond assures a fail safe installation. Typically, a seal withstanding ten (10) psig is adequate.

Lastly, the wider dimension of the sleeve 28 provides a tighter fit, since a greater peripheral sealing area and consequent greater holding friction results.

A typical installation employing an embodiment of this invention has the following specifications and dimensions, it being understood that these are given as exemplary only and not as limitations.

| | |
|---|---|
| Diameter of hole 12 | 12.0 inches |
| Outside diameter of portion of gasket that fits into hole 12, unexpanded | 11.61 inches |
| Thickness of portion of gasket 16 which fits into hole 12 | 0.475 inch |
| Tensile strength of rubber | 1,800 psi minimum |
| Elongation of rubber | 450%–550% |
| Durometer of rubber | 42 ± 5 |
| Width of sleeve 28 | 1.5 inch |
| Thickness of sleeve 28 | 0.120 inch |
| Material of sleeve 28 | Type 304 Stainless Steel |
| Diameter of sleeve 28, expanded | 11.36 inches |
| Tensile strength of steel | 85,000 psi |
| Yield strength of steel | 35,000 psi |
| Single take-up clamp 20 used for pipe 14 O.D.'s up to 16.5 inches. | |
| Double take-up clamp 20 used for pipe 14 O.D.'s over 16.5 inches. | |

While there have been described above the principles of this invention in connection with specific apparatus, it is to be clearly understood that this description is made only by way of example and not as a limitation to the scope of the invention.

What is claimed is:

1. An expandable locking sleeve for use in radially expanding a tubular gasket of elastomeric material into compressive sealing engagement with the wall of a cylindrically shaped opening and comprising a cylindrical relatively stiff but resiliently flexible strip of metal having opposed abuttably engageable ends, said strip being movable between two positions in which end portions thereof may first be radially overlapped and secondly may be interlockingly engaged end-to-end, the first of said end portions having a short substantially flat sided channel-shaped portion provided with a recess disposed between the opposite side edges of the strip and extending circumferentially from and opening through the end edge of said first end portion, said channel-shaped portion having two opposed retaining shoulders extending in a direction substantially circumferentially of said strip from said end edge which further define said recess, the second of said end portions having a longitudinally projecting tab, said second end portion also having a radially inwardly displaced step portion, said tab being adapted to be slidably received by said recess between said retaining shoulders with the end edge of said first end portion in juxtaposed abuttable alignment with said step portion, two ledge portions on said first end extending laterally opposite and integrally from said two retaining shoulders, respectively, said ledge portions being substantially flat and displaced radially opposite from the outer surface of said channel-shaped portion substantially in parallelism therewith, said ledge portions also extending back from said first end edge, stepped side portions connecting said ledge portions to said retaining shoulders, respectively, and forming an integral part thereof, said second end having two circumferentially extending substantially flat fingers on opposite sides, respectively, of said tab, said fingers being engageable in radially overlying relation with said ledge portions, respectively, when said tab is received by said recess, the radially outer surface of said tab or channel-shaped portion being of extended area lying substantially within the circumferential outer surface of said strip as a substantially uninterrupted cylindrical circumferential continuation thereof when said tab is engaged with said recess and said first end edge is immediately adjacent to said step portion.

2. An expandable locking sleeve for use in radially expanding a tubular gasket of elastomeric material into compressive sealing engagement with the wall of a cylindrically shaped opening and comprising a cylindrical relatively stiff but resiliently flexible strip of metal having opposed operatively abuttably engageable ends, said strip being movable between two positions in which end portions thereof may first be radially overlapped and secondly may be interlockingly engaged end-to-end, the first of said ends having a short substantially flat sided channel-shaped portion having a recess disposed between the opposite side edges of the strip and extending circumferentially from and opening through the first end edge, said channel-shaped portion having two opposed retaining shoulders extending substantially circumferentially of said strip which further define said recess, the second of said ends having a radially inwardly displaced portion of said strip forming a transverse step portion spaced from the distal end of said second end, said displaced portion also forming a tab extending toward said distal end and having an end edge spaced inwardly from said distal end, said tab being adapted to be slidably received by said recess between said retaining shoulders with the end edge of said first end in juxtaposed abuttable alignment with said step portion, the radially outer surface of the channel-shaped portion being of extended area lying substantially within the circumferential outer surface of said strip as a substantially uninterrupted circumferential continuation thereof when said tab is engaged with said recess and said first end edge is immediately adjacent to said step portion, two ledge portions on said first end extending laterally opposite and integrally from said two retaining shoulders, respectively, said ledge portions being substantially flat and displaced radially opposite from the radially outer surface of said channel-shaped portion in substantial parallelism therewith, said ledge portions also extending back from said first end edge, stepped side portions connecting said ledge portions to said retaining shoulders, respectively, and forming an integral part thereof, portions of said ledge portions spaced back from said first end edge being defined by abutment steps, respectively, integral with said strip, said second end having two circumferentially extending substantially flat fingers on opposite sides, respectively, of said tab, said fingers being engageable in radially overlying relation with said ledge portions, respectively, when said tab is received by said recess, the outer surfaces of said fingers being of extended area and lying within the circumferential outer surface of said strip as a substantially uninterrupted cylindrical continuation thereof.

3. The sleeve of claim 2 wherein said first end edge is substantially parallel to the axis of said cylindrical strip, said ledge portions being joined to said strip by said abutment steps extending radially of said strip and along a line substantially parallel to said first end edge, said abutment steps being abuttably juxtaposed with the distal ends of said fingers, respectively, when said tab is received by said recess.

4. The sleeve of claim 3 wherein the thickness of said strip is substantially uniform and the displacement of said tab and ledge portions and the depth of said recess are substantially equal to said thickness.

5. The sleeve of claim 3 wherein two circumferential notches are provided in said second end between said tab and fingers and adapted to receive said retaining shoulders and step portions, respectively, and said tab being shorter than said fingers.

6. The sleeve of claim 3 wherein the outer surfaces of said channel-shaped portion and fingers are immediately adjacent and lie within the outer cylindrical surface of said strip when said first end edge is engaged with said step portion and the ends of said fingers are engaged with said abutment step.

7. An expandable locking sleeve for use in radially expanding a tubular gasket of elastomeric material into compressive sealing engagement with the wall of a cylindrically shaped opening and comprising a cylindrical relatively stiff but resiliently flexible split strip of metal having opposed abuttably engageable end portions, said strip being movable between two positions in which end portions thereof may first be radially overlapped and secondly may be interlockingly engaged end-to-end, and means for locking said end portions in end-to-end relation, said means including radially overlapped portions on each of said ends which have outer peripheral surfaces that lie in and extend over an extended area substantially coincident with the outer cylindrical surface of said strip, said overlapped portions including a channel-shaped portion having a recess on one end portion and radially spaced tab and fingers on the other end portion, a radial step portion on said other end portion which determines the radial spacing between said tab and fingers, said overlapped portions including abuttable portions of said tab, recess, fingers and step portion which are both laterally and circumferentially engageable to hold said end portions against lateral displacement and against circumferential movement toward each other.

8. The sleeve of claim 7 wherein said abuttable portions have mutually abuttable straight edges which extend both axially and circumferentially of said strip.

9. The locking sleeve of claim 3 including in combination a tubular gasket of elastomeric material, said strip being coaxially engaged with the inner surface of said gasket whereby the outer surface of said strip substantially uniformly circumferentially and uninterruptedly engages the inner surface of said gasket including the outer surface portion of said interlocked ends.

10. The locking sleeve of claim 7 wherein said strip has a width which prevents tilting of the sleeve once installed against the resistance of the compressed gasket.

11. The locking sleeve of claim 10 including a tubular gasket of elastomeric material having a rubber durometer of about 42±5 and said sleeve is coaxially fitted therein and wherein said sleeve provides a sealing force against a pressure of at least ten psig and has a width to gasket thickness ratio of about 1.5 to 0.475.

* * * * *